(12) United States Patent
Fischer

(10) Patent No.: US 9,283,922 B2
(45) Date of Patent: Mar. 15, 2016

(54) AIRBAG FOR A VEHICLE OCCUPANT RESTRAINT SYSTEM

(71) Applicant: TRW Automotive GmbH, Alfdorf (DE)

(72) Inventor: Anton Fischer, Schechingen-Leinweiler (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/395,834

(22) PCT Filed: Apr. 23, 2013

(86) PCT No.: PCT/EP2013/001214
§ 371 (c)(1),
(2) Date: Oct. 21, 2014

(87) PCT Pub. No.: WO2013/159909
PCT Pub. Date: Oct. 31, 2013

(65) Prior Publication Data
US 2015/0137488 A1  May 21, 2015

(30) Foreign Application Priority Data
Apr. 25, 2012 (DE) .......................... 10 2012 008 114

(51) Int. Cl.
*B60R 21/235* (2006.01)
*B60R 21/2334* (2011.01)
*D03D 1/02* (2006.01)
*D03D 11/02* (2006.01)
*D03D 13/00* (2006.01)

(52) U.S. Cl.
CPC ........... *B60R 21/235* (2013.01); *B60R 21/2334* (2013.01); *D03D 1/02* (2013.01); *D03D 11/02* (2013.01); *D03D 13/00* (2013.01); *B60R 2021/23509* (2013.01); *B60R 2021/23538* (2013.01); *B60R 2021/23542* (2013.01); *B60R 2021/23571* (2013.01)

(58) Field of Classification Search
CPC .................. B60R 21/235; B60R 2021/23542; B60R 2021/23509; B60R 21/2334; B60R 2021/23538; B60R 2021/23571; D03D 1/02; D03D 11/02; D03D 13/00
See application file for complete search history.

(56) References Cited

U.S. PATENT DOCUMENTS

| 6,220,309 B1 * | 4/2001 | Sollars, Jr. ................... 139/389 |
| 6,742,805 B2 * | 6/2004 | Hill ............................ 280/730.2 |
| 2003/0146614 A1 * | 8/2003 | Zarazua Mauleon ...... 280/743.2 |

(Continued)

FOREIGN PATENT DOCUMENTS

| DE | 3903216 | 8/1990 |
| DE | 102008047600 | 4/2010 |

(Continued)

*Primary Examiner* — Drew Brown
(74) *Attorney, Agent, or Firm* — Tarolli, Sundheim, Covell & Tummino LLP

(57) ABSTRACT

An airbag (20) for a vehicle occupant restraint system comprises a first fabric layer (10) and an opposed second fabric layer (12) each being formed of a composite fabric of wefts and warps and delimiting a chamber (14) adapted to be filled with gas. Plural weaving threads (16) are provided which exit the composite fabric of a fabric layer (10, 12) in the direction of the other fabric layer (12, 10) and are freely floating in the chamber (14) before they enter into the composite fabric of the other fabric layer (12, 10). The weaving threads (16) are movable in their longitudinal direction relative to the inlet and outlet points.

12 Claims, 3 Drawing Sheets

(56) References Cited

U.S. PATENT DOCUMENTS

2005/0098995 A1* 5/2005 Fischer .................. 280/743.2
2007/0200329 A1* 8/2007 Ma ........................ 280/743.1
2009/0224521 A1* 9/2009 Huber .................... 280/743.1

FOREIGN PATENT DOCUMENTS

| EP | 2221405 A1 * | 8/2010 |
| WO | 2007100377 | 9/2007 |
| WO | 2012031643 | 3/2012 |

* cited by examiner

AIRBAG FOR A VEHICLE OCCUPANT RESTRAINT SYSTEM

RELATED APPLICATIONS

This application corresponds to PCT/EP2013/001214, filed Apr. 23, 2013, which claims the benefit of German Application No. 10 2012 008 114.6, filed Apr. 25, 2012, the subject matter of which are incorporated herein by reference in their entirety,

BACKGROUND OF THE INVENTION

The invention relates to an airbag for a vehicle occupant restraint system.

Airbags for vehicle occupant restraint systems are known in which two fabric layers are simultaneously manufactured and interwoven in one piece in the border area ("one-piece woven airbags" as they are called). Furthermore, specifically woven airbags are known in which individual weaving threads exit the composite fabric of a fabric layer close to the one-piece woven fabric section and enter into the composite fabric of the second fabric layer. These threads are intended to initially bring about a defined distance between the fabric layers upon inflation of the airbag. Moreover, these threads are to relief the woven connecting area between the two fabric layers.

Such airbag is shown in DE 10 2008 047 600 A1. Starting from the border area, individual weaving threads alternately exit the composite fabric of one of the fabric layers obliquely in the direction of the respective other fabric layer and are floating freely inside the airbag, before they enter into the composite fabric of the other fabric layer. At the inlet and outlet points the weaving threads are tightly connected to the respective fabric layer. In this way an optimum relief of the connecting portion as well as sort of "reefing" of the fabric layer is achieved. By such reefing the fabric is compressed and compacted in the border area, thereby the tear resistance and the gas tightness being increased.

SUMMARY OF THE INVENTION

Compared to this, it is the object of the invention to exert a strong tensile effect directed to the interior of the airbag on particular sections of the airbag upon inflation of an airbag.

This object is achieved by an airbag comprising the features of claim 1. Advantageous and expedient configurations of the airbag according to the invention are stated in the subclaims.

The airbag for a vehicle occupant restraint system according to the invention comprises a first fabric layer and an opposite second fabric layer, each being formed of a composite fabric of warp and weft yarns and delimiting a chamber to be filled with gas. Plural weaving threads are provided which exit the composite fabric of one fabric layer in the direction of the other fabric layer and are floating freely in the chamber before they enter into the composite fabric of the other fabric layer. According to the invention, the weaving threads are movable in their longitudinal direction relative to the inlet and outlet points.

The longitudinal mobility of the weaving threads is achieved in that the weaving threads are accommodated not tightly but loosely in the respective composite fabric at plural, preferably all inlet and outlet points (except their ends). The invention is based on the finding that the weaving threads loosely guided to and fro between the two fabric layers—by reversal of the block-and-tackle principle—can entail an especially efficient draw-in of particular airbag sections with a given deployment force and direction by multiplying the distance. It is not possible to achieve a comparable effect by weaving threads which extend to be freely floating from one fabric layer to the other, but are fixed at the inlet and outlet points.

The draw-in of particular airbag sections achieved with the aid of the invention can be exploited for systematically influencing the deployment behavior and/or for producing a desired airbag shape in the inflated state. Another possible application is the control of airbag valves, especially discharge valves, which is carried out directly or indirectly or is at least supported by the draw-in of an airbag section. Also tethers positioned inside or outside of the airbag can be tensioned in this way. In general, the effect of the loosely guided weaving threads is comparable to that of a so called pneumatic muscle.

In accordance with the preferred embodiment of the invention, the weaving threads are guided at the inlet and outlet points merely by simple cross loops of the respective composite fabric. If the weaving threads at the inlet and outlet points extended longer in the composite fabric of the respective fabric layer, the sliding of the weaving threads in the longitudinal direction required for the invention could not be easily ensured.

What is most efficient is the desired draw-in of particular airbag sections, when the weaving threads movable in their longitudinal direction relative to the inlet and outlet points during inflation of the airbag, i.e. when the opposed fabric layers are spaced apart from each other, extend in zigzag between the two fabric layers. Such course can be achieved most easily in that the cross loops of the first fabric layer are arranged to be offset against the cross loops of the second fabric layer related to the longitudinal direction of the weaving threads.

The ends of the weaving threads should be attached not loosely but with tensile strength to either of the fabric layers or to a border area in which the fabric layers are interconnected in order to achieve the desired effect.

In certain applications it is provided to draw in an extension of the airbag. This is achieved with the aid of the invention in that at least part of the weaving threads is tightly arranged at one end on such airbag extension. This application is especially advantageous in connection with the tensioning of tethers during the inflating operation, when such tether is bonded to the airbag extension.

At their other end, the weaving threads should be arranged in a central area of the airbag, preferably in an area toward which an outer airbag portion is to be drawn in.

The invention can be realized in an especially advantageous manner in a one-piece woven airbag in which the two fabric layers are interwoven in one piece in a border area and delimit a chamber adapted to be filled with gas. When manufacturing such airbag, the weaving threads can be woven together with the two fabric layers during the same production step. In this case further treatment is not required.

BRIEF DESCRIPTION OF THE DRAWINGS

Further features and advantages of the invention are resulting from the following description and from the enclosed drawings which are referred to and in which.

DESCRIPTION OF EMBODIMENTS

Figure 1:
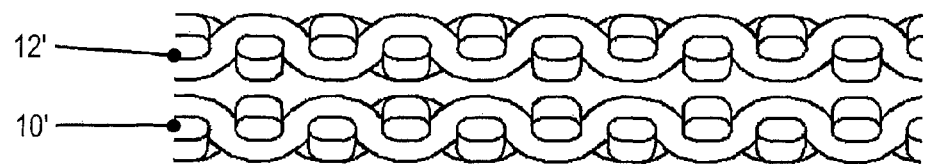
FIG. 1 shows a lateral sectional view of two opposed fabric layers, each having a conventional composite fabric.

In FIG. 1 two fabric layers 10' and 12' of a so called "one-piece woven" airbag are shown each of which consists of a composite fabric of wefts and warps. The two fabric layers 10', 12' are woven on top of each other in one production step and are interconnected in one piece in a border area (not shown) by combining them into a very dense fabric. The border area delimits a chamber 14 formed between the fabric layers 10', 12' and adapted to be filled with gas. The chamber 14 can be the only one or one of plural chambers of the airbag.

Figure 2:
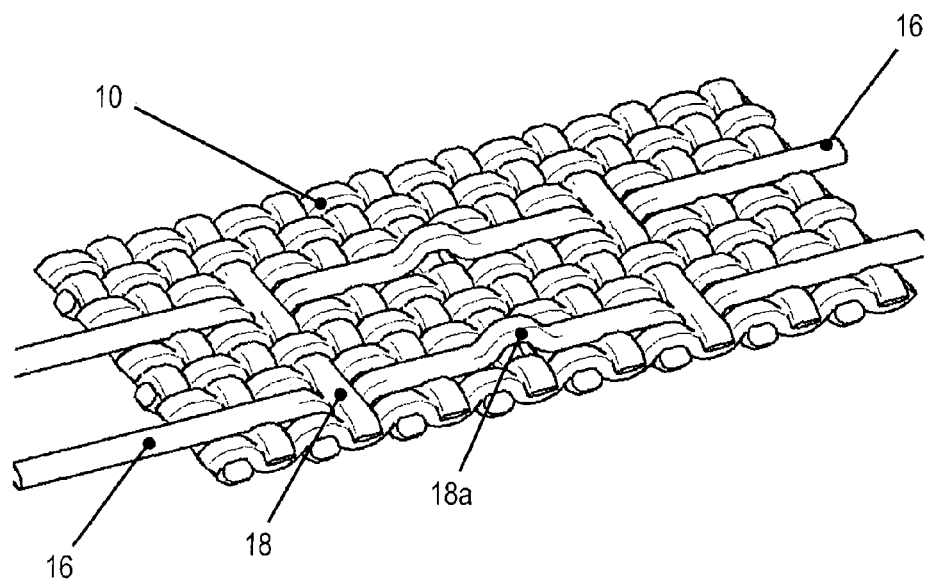
FIG. 2 shows a perspective view of an individual fabric layer of an airbag according to the invention.
Figure 3:
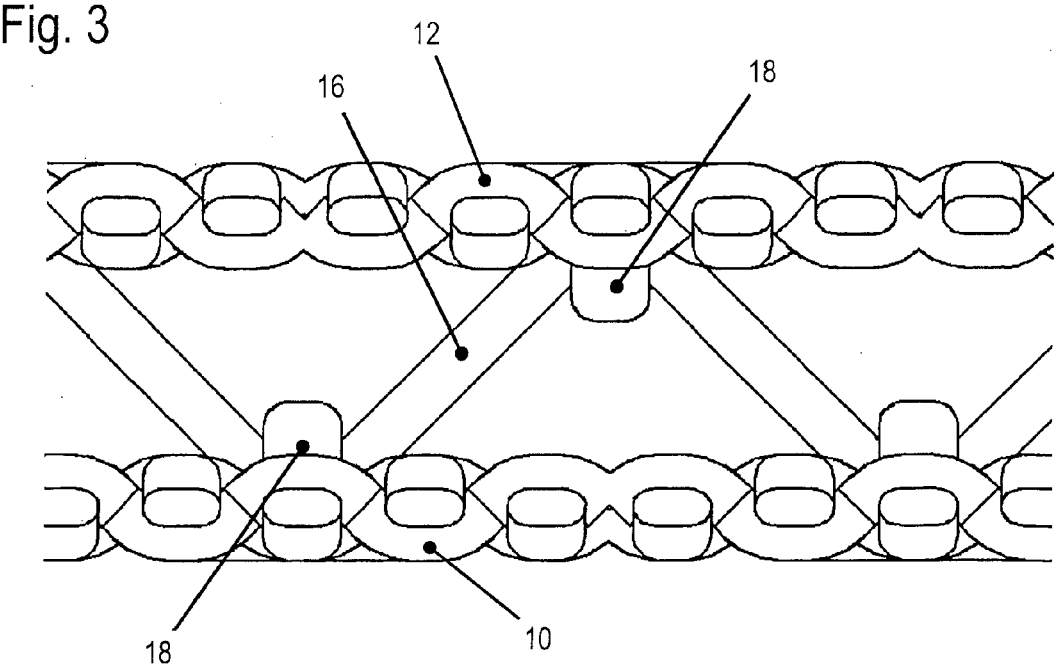
FIG. 3 shows a lateral sectional view of two opposed fabric layers during inflation of an airbag according to the invention.

FIG. 2 shows a fabric layer 10 of an airbag according to the invention corresponding to the lower fabric layer 10' of FIG. 1. Opposed thereto, a fabric layer 12 corresponding to the fabric layer 12' is located, which fabric layer 12 was omitted here for the sake of clarity (but is shown in FIG. 3).

Individual weaving threads 16 spaced apart from each other extend loosely between the two fabric layers 10, 12 and at individual points only are alternately guided through loops 18 of selected cross threads of the respective composite fabric. Each of the cross loops 18 is formed on the surface of the fabric layer opposing the other fabric layer. In FIG. 2 for each weaving thread 16 only two cross loops 18 are visible in the fabric layer 10; between two such cross loops 18 the weaving threads 16 are guided through the respective cross loops 18 of the other fabric layer 12, however (indicated at position 18a in FIG. 2).

All points where the weaving threads 16 are guided through the cross loops 18 are referred to as inlet and outlet points, as the yarns 16 at these points alternately exit the composite fabric of one fabric layer in the direction of the other fabric layer, wherein they are floating freely in the chamber 14 before they enter into the composite fabric of the other fabric layer. Thus the weaving threads 16 cannot be assigned either to the one or to the other fabric layer 10 and 12, resp., although they are woven in the same production step as the fabric layers 10, 12.

The weaving threads 16 loosely accommodated in the respective composite fabric are fastened only at their ends to either of the fabric layers 10 or 12 or in the connected border area. More exactly speaking, although the mobility of the weaving threads 16 is restricted at the inlet and outlet points by the cross loops 18 transversely to their longitudinal direction, they are still movable in their longitudinal direction and can slide through the cross loops 18.

FIG. 3 illustrates the fabric layers 10, 12 upon inflation of the airbag. Each of the weaving threads 16 extends obliquely from the one fabric layer 10 to the other fabric layer 12 and vice versa. This zigzag course of the weaving threads 16 ensures that the areas of the airbag at which the ends of the weaving threads 16 are fastened are drawn into the interior of the airbag by far more strongly than it would be the case in a usual deployment procedure, when an airbag is transformed from a two-dimensional into a three-dimensional form by being filled with gas. This becomes clear when the FIGS. 4 and 5 are contemplated.

Figure 4:
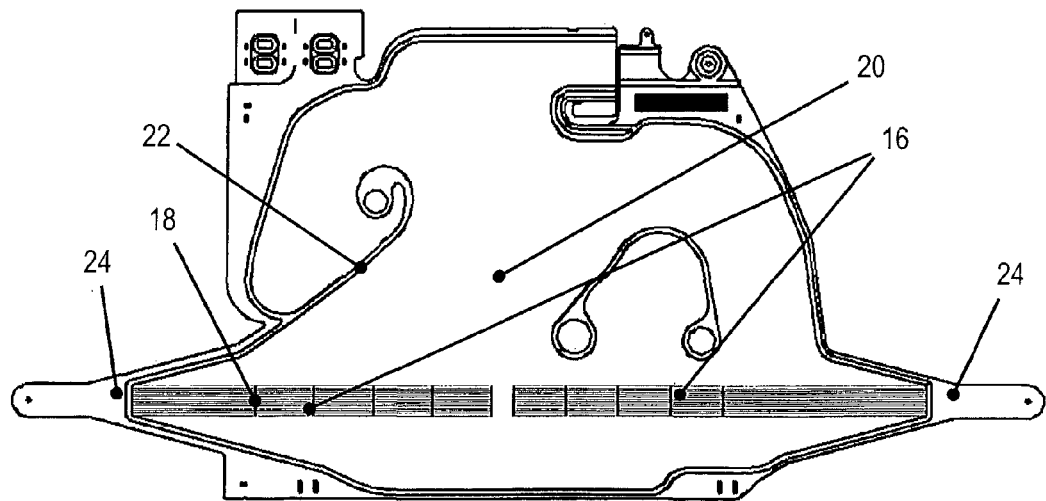
FIG. 4 is a top view of an airbag according to the invention.
Figure 5:
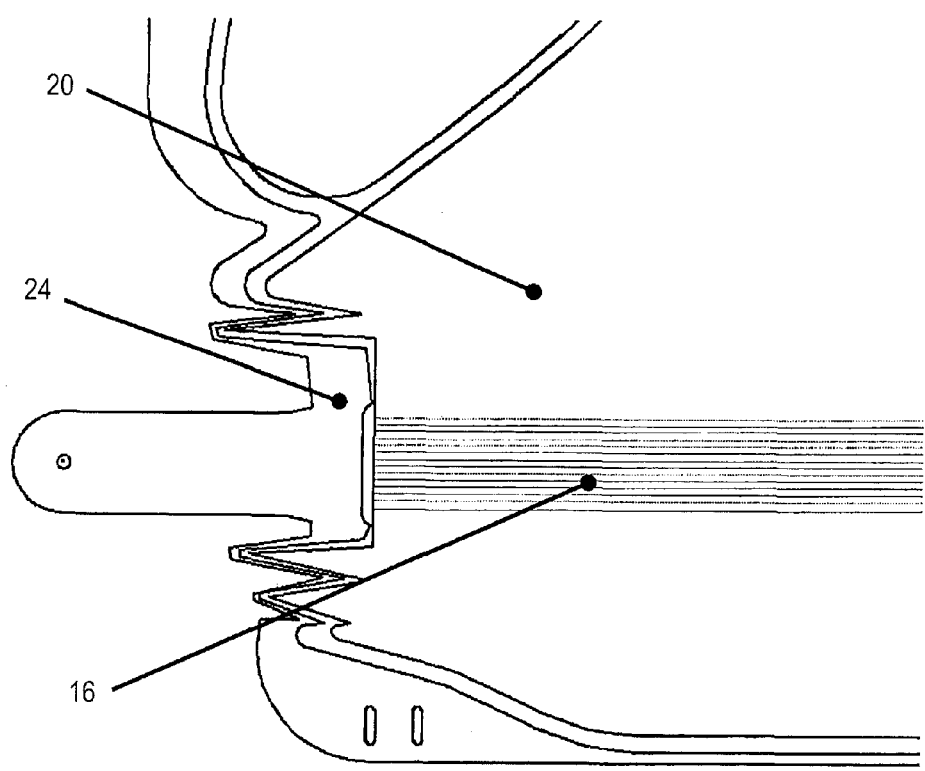
FIG. 5 is a detailed view of the airbag of FIG. 4 in the inflated state.

In the schematic FIG. 4 an airbag 20 is exemplified in the non-inflated state. Apart from the peripheral edge, the opposed fabric layers are interconnected at several further points 22 (by seams or by interweaving in one piece). The airbag 20 includes two opposed extensions 24 at which e.g. a tether can be arranged. Plural weaving threads 16 are fastened by one end in the area of an extension 24 and by the other end in a central area of the airbag 20. There between the weaving threads 16 are taken out of the composite fabric of the fabric layers 10, 12, as described above, and are guided through loops 18 only at selected cross threads. This applies mutatis mutandis to the other extension 24 and the weaving threads 16 related thereto.

When the airbag 20 is inflated, the initially superimposed fabric layers 10, 12 are removed from each other. Since the weaving threads 16 cannot remove themselves or detach from one of the fabric layers 10, 12 due to their special zigzag guiding allowing longitudinal mobility through the cross loops 18, by their fastened ends they draw the cross loops 18 and, due to the multiplied distance, especially the extensions 24 into the interior of the airbag. The draw-in of an extension 24 is illustrated in detail in FIG. 5.

LIST OF REFERENCE NUMERALS

10, 10' fabric layer
12, 12' fabric layer
14 chamber
16 weaving threads
18 cross loops
20 airbag
22 connecting points
24 extensions

The invention claimed is:

1. An airbag (20) for a vehicle occupant restraint system, comprising:
   a first fabric layer (10) and an opposed second fabric layer (12), each being formed of a composite fabric of wefts and warps and delimiting a chamber (14) adapted to be filled with gas,
   wherein plural weaving threads (16) are provided which are fixed at their ends to one of the fabric layers or to a border area of the airbag where the fabric layers are connected, and wherein weaving threads exit the composite fabric of a fabric layer (10, 12) in the direction of the other fabric layer (12, 10) at plural of inlet and outlet points and are freely floating in the chamber (14) before they enter into the composite fabric of the other fabric layer (12, 10),
   and wherein the weaving threads (16) are movable in their longitudinal direction relative to the inlet and outlet points and arranged to reduce the length of the airbag in the direction along which the weaving threads extend when the airbag is inflated.

2. The airbag (20) according to claim 1, wherein the weaving threads (16) are guided through simple cross loops (18) of the respective composite fabric at the inlet and outlet points.

3. The airbag (20) according to claim 2, wherein the cross loops (18) of the first fabric layer (10) are arranged offset against the cross loops (18) of the second fabric layer (12) related to the longitudinal direction of the weaving threads (16).

4. The airbag (20) according claim 1, wherein the ends of the weaving threads (16) are arranged with tensile strength at one of the fabric layers (10, 12) or at a border area in which the fabric layers (10, 12) are interconnected.

5. The airbag (20) according to claim 1, wherein at least part of the weaving threads (16) is tightly arranged at one end on an airbag extension (24).

6. The airbag (20) according to claim 5, wherein the weaving threads (16) are arranged at their other end in a central area of the airbag (20).

7. The airbag (20) according to claim 1, wherein the airbag (20) is a one-piece woven airbag (20) in which the two fabric layers (10, 12) are interwoven in one piece in a border area and delimit a chamber (14) adapted to be filled with gas, the opposite ends of the weaving threads both being fixed at the border area.

8. The airbag according to claim 1, wherein the opposite ends of the weaving threads are fixed in the area of extensions at opposite ends of the airbag, the reduction in length imparted to the airbag by the weaving threads upon inflation acting to draw-in the extensions.

9. The airbag according to claim 8, wherein the extensions are configured for being connected to the vehicle so that the airbag is tensioned between the extensions due to the drawing-in of the extensions upon airbag inflation.

10. An airbag for a vehicle occupant restraint system, comprising:
    a first fabric layer and an opposed second fabric layer, each being formed of a composite fabric of wefts and warps and having portions woven together along a border area that together with the first and second fabric layers delimits a chamber adapted to be filled with gas,
    wherein plural weaving threads are provided which are fixed at their ends adjacent or near the border area, and wherein weaving threads extend back and forth in a zigzag manner between the fabric layers, passing through loops in formed by threads in the fabric layers, the weaving threads being freely floating in the chamber between the fabric layers and freely moveable through the loops,
    and wherein the weaving threads are adapted to move through the loops in response to the fabric layers moving apart from each other due to airbag inflation, which reduces the length of the airbag.

11. The airbag according to claim 10, wherein the opposite ends of the weaving threads are fixed in the area of extensions at opposite longitudinal ends of the airbag, the reduction in length imparted to the airbag by the weaving threads upon inflation acting to draw-in the extensions.

12. The airbag according to claim 11, wherein the extensions are configured for being connected to the vehicle so that the airbag is tensioned between the extensions due to the drawing-in of the extensions upon airbag inflation.

\* \* \* \* \*